United States Patent [19]

Buscher et al.

[11] Patent Number: 5,679,989
[45] Date of Patent: Oct. 21, 1997

[54] TORQUE MOTORS WITH ENHANCED RELIABILITY

[75] Inventors: John H. Buscher, East Amherst; Mark P. Ernewein, Hamburg; Henry R. Bronke, Colden, all of N.Y.

[73] Assignee: J. H. Buscher, Inc., Orchard Park, N.Y.

[21] Appl. No.: 389,141

[22] Filed: Feb. 15, 1995

[51] Int. Cl.$^6$ .................... H02K 15/14; H02K 5/04
[52] U.S. Cl. ..................... 310/42; 310/89; 310/51
[58] Field of Search ................... 310/28, 89, 42, 310/51

[56] References Cited

U.S. PATENT DOCUMENTS

| | | | |
|---|---|---|---|
| 2,891,181 | 6/1959 | Atchley | 310/36 |
| 3,381,150 | 4/1968 | Trbovich et al. | 310/29 |
| 3,415,283 | 12/1968 | Trbovich et al. | 137/625.62 |
| 3,938,778 | 2/1976 | Hansen et al. | 251/129 |
| 4,855,630 | 8/1989 | Cole | 310/156 |
| 4,968,911 | 11/1990 | Denk | 310/42 |

FOREIGN PATENT DOCUMENTS

WO87/06051  10/1987  WIPO ............... H01F 7/08

*Primary Examiner*—Steven L. Stephan
*Assistant Examiner*—Judson H. Jones
*Attorney, Agent, or Firm*—Howard M. Ellis

[57] ABSTRACT

More reliable torque motors are provided with reduced susceptibility to external vibration while also maximizing structural damping without requiring the usual potting with resins and adhesives, bolting hardware, etc. Enhanced torque motor dependability is achieved by clamping torque motor assemblies rigidly in place through frictional forces generated by a generally thin walled tubular housing preferably having surface elevations which compressively engage the motor assembly through an interference fit. The more reliable torque motors are especially useful in aviation applications as actuators for servovalves, and wherever highly reliable virtual fail-safe performance is required.

27 Claims, 6 Drawing Sheets

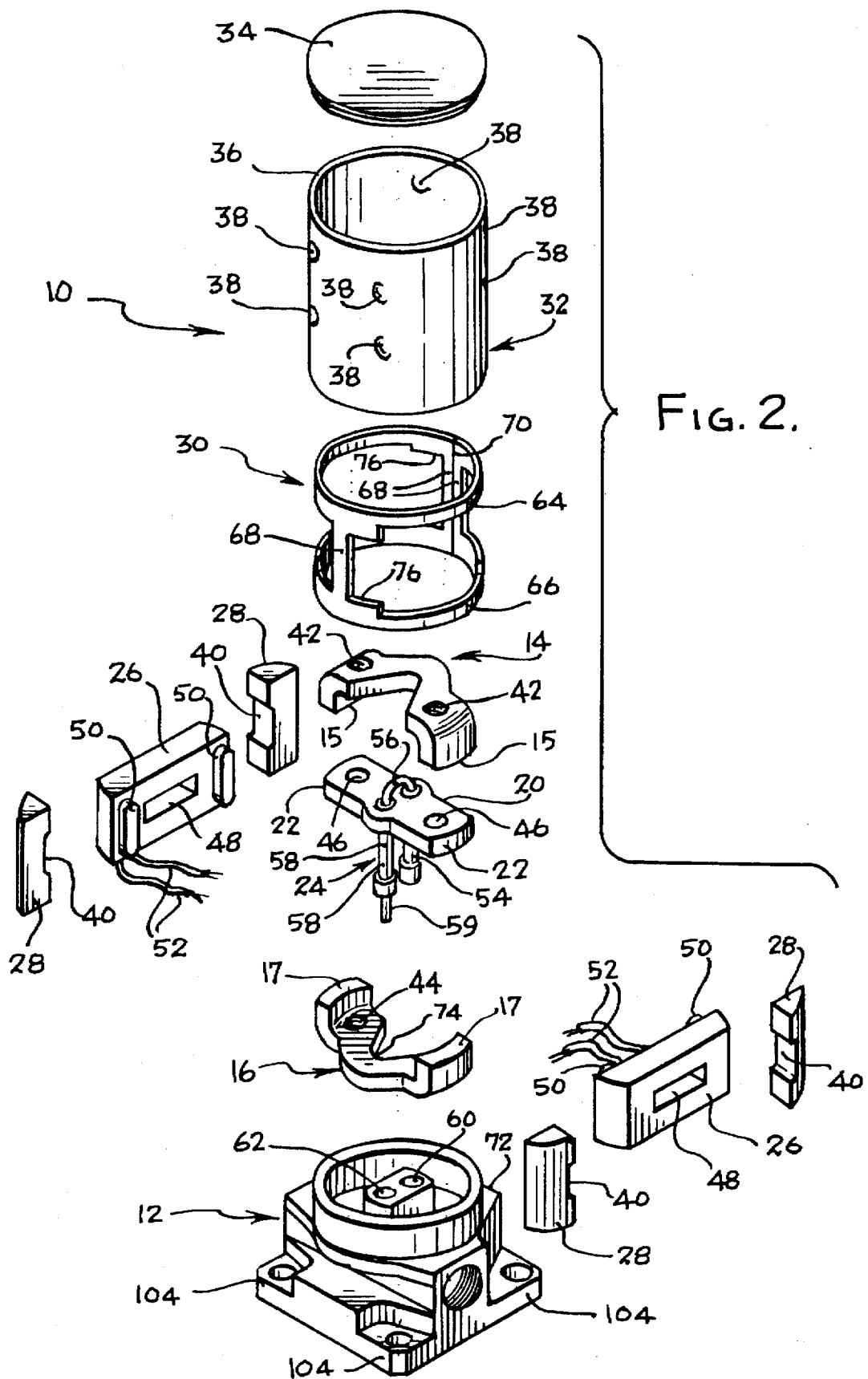

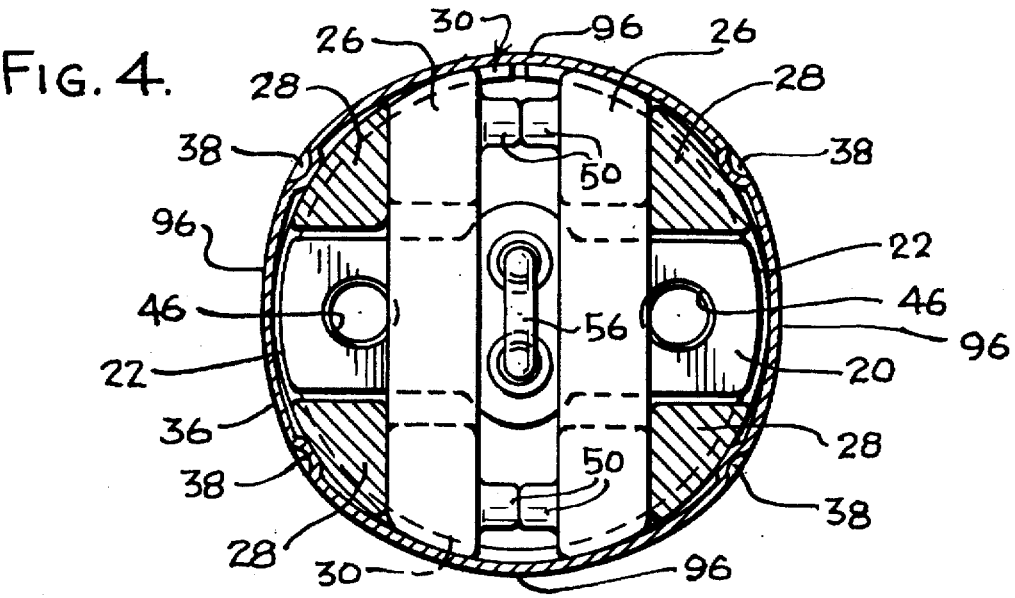
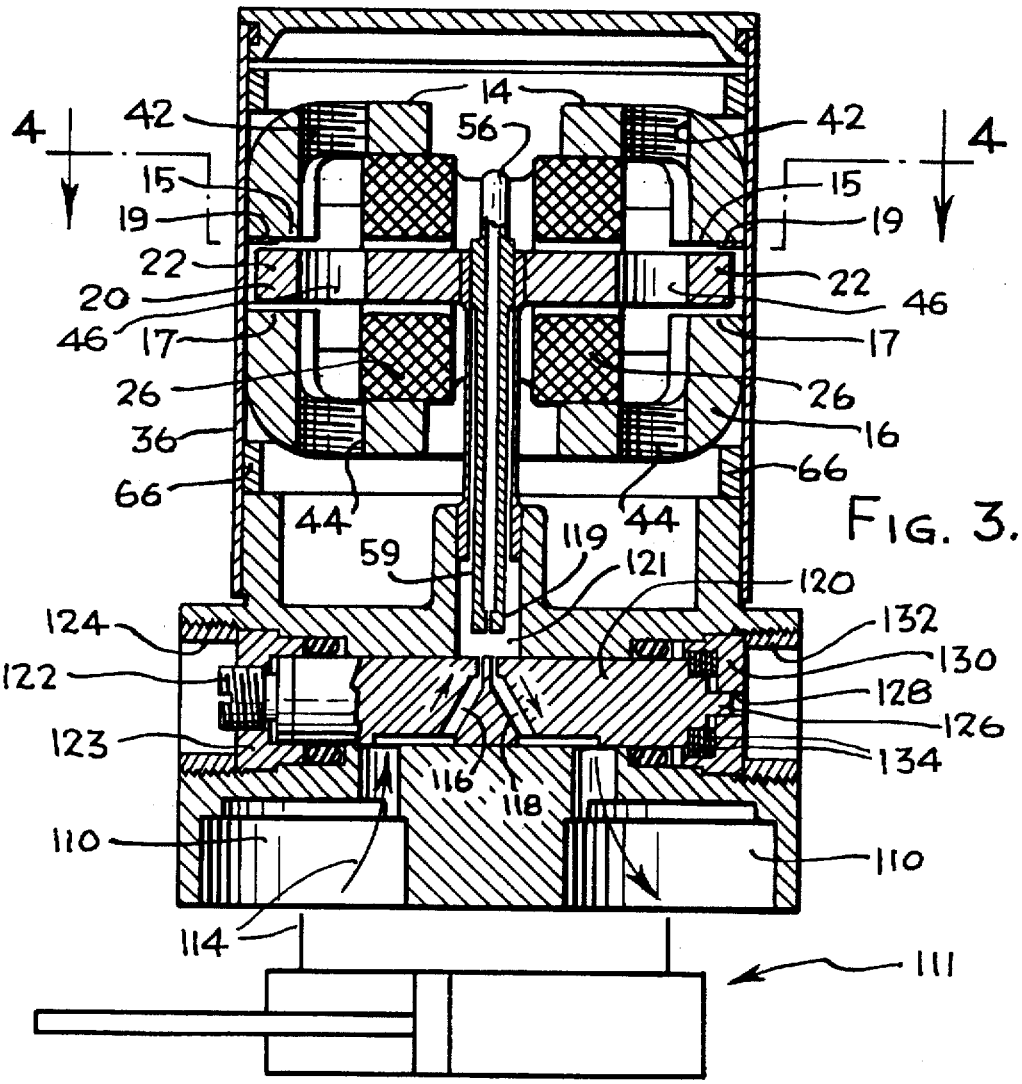
FIG. 4.
FIG. 3.

TORQUE MOTORS WITH ENHANCED RELIABILITY

TECHNICAL FIELD

This invention relates generally to electromagnetic actuators, and more specifically, to improved motors, methods of assembly and applications therefor, such as in aviation where standards of motor reliability and performance are necessarily very high despite external vibration and temperature cycles being quite extreme.

BACKGROUND OF THE INVENTION

Torque motors may be characterized as actuators which are suitable for moving through displacements in the order of ±0.005 inches, have adjustable positional stiffness, move proportionally under command of an electrical signal, and do so repeatedly regardless of signal polarity, for increasing or decreasing signal amplitude.

Typically, torque motors are constructed from a pair of pole pieces, an armature, flexural or pivoting means to locate the armature within the torque motor structure, one or more coils, at least one magnet, and a motor housing. Such motors are useful in operating valves in controlling fluid flow; operating springs, clutches, braking systems; focusing lenses; in machine tools; industrial controls, to name but a few. In aviation applications torque motors can be used in jet engines, for instance, in controlling fluid flow, in operating hydraulic systems, and so on.

In several of the foregoing applications, torque motors are required to perform critical control operations, such as actuators for servovalves for controlling fuel flow to jet aircraft engines. The environmental conditions under which such torque motors frequently operate can be very severe. Repetitive extreme temperature cycles, and particularly, vibration generated by aircraft engines are common problems. Resistance to vibration is of great importance for such applications, both from the standpoint of avoiding damage to the torque motor, and the effect of vibration on motor performance and reliability.

In an effort to overcome the problem of external vibration manufacturers of torque motors, such as Servotronics, Inc.; Moog, Inc., and HSC Controls have utilized various techniques. For example, one method has been to loosely assemble the components of torque motors, and employ a potting process of filling spaces between coils and magnets and motor housing with curable polymeric fillers, such as epoxy resin. While the potting method is capable of imparting increased rigidity to the internal components of the motor, this method has several disadvantages. For one, it fails to provide desired levels of rigidity of motor components relative to the motor housing. Torque motors having aircraft applications must also meet critical reliability indices. The problem is, it is difficult to inspect or test the epoxy bond to motor structure to determine if components imbedded in the polymeric matrix meet the required higher reliability standards associated with aviation applications. Moreover, the thermal coefficient of expansion of the polymer is usually different from that of the structure of the torque motor, and Young's modulus of epoxy resins is small compared to that of motor components.

Other problems are of an environmental and economic nature. For instance, use of adhesive resinous fillers require careful degreasing of bond surfaces on motor components. The prescribed method is by cleaning components with chlorofluorocarbon solvents. However, when used CFCs become discharged into the atmosphere, are broken down by sunlight to release chlorine into the stratosphere, which in-turn has a catalytic and destructive effect on the global ozone shield. This increases the amount of harmful ultraviolet radiation reaching Earth's surface. Hence, as part of the national and global strategies, use of most CFCs has been curtailed. In fact, customer purchase orders for torque motors frequently specify that manufacturers meet all such environmental regulations, which means eliminating the use of CFCs during assembly. Finally, the application of polymeric fillers between component parts is a slow and inefficient process, and economically unattractive.

Still, several manufacturers sandwich permanent magnets between pole pieces using threaded fasteners to clamp components together. While the resulting structure can be stiff this method fails to impart adequate structural damping and resistance to resonant motion of the motor structure when it is subject to vibration at or near the resonant frequency of the torque motor structure. The amplitude of this movement can be very large and will result in mechanical damage to motor components. This is believed to be due to the lack of friction damping between component parts. Resonance and concomitant wearing of parts due to relative motion between components will generate unwanted magnetic dust-like particles which accumulate in air gaps between the armature and pole pieces, which eventually leads to motor failure by limiting motion of the armature.

Others in the field have employed various methods for controlling vibration, including a combination of threaded fasteners and polymeric filler/binder to improve rigidity. In this method, the actuator assembly is first bolted and then filled with a curable epoxy resin applied to support the coil in the middle of the bolted assembly. A further method is to rely on protuberances on the coils made from a flexible potting compound. The protuberances become compressed between structural components of the assembly under forces generated by threaded screws. This method does not perform well because the applied forces are sufficient to cause distortion of actuator parts, including distortion during heating/cooling cycles. Eventually, the interference effect of the protuberances is reduced due to repeated thermal cycles.

Still other manufacturers have used methods for reducing susceptibility to external vibration by means of a rigid cast stainless steel tubular type housing with coils secured by either close fit or an epoxy resinous filler and magnets retained by soldering or brazing onto pole tips. This provides an assembly made up of four magnets, two at each end. The assembly of two magnets and two poles is then tack welded to the stainless steel housing.

Accordingly, there is need for improved torque motors with reduced susceptibility to external vibration while also maximizing structural damping for greater reliability and motor life expectancy. In addition, there is need for improved methods of assembling torque motors without polymeric fillers, potting techniques, assembly bolting or combinations thereof which impart added stiffness, and sufficient damping to prevent large amplitude relative to motion of the torque motor assembly in the event of resonant motion.

SUMMARY OF THE INVENTION

In accordance with the invention more reliable torque motors are provided with reduced susceptibility to external vibration while also maximizing structural damping. Greater motor dependability is achieved without reliance on forming rigid structures by the usual potting techniques using resins and adhesives, bolting fasteners, and the like. Instead, the inventors have discovered that torque motor assemblies can be held rigidly in place through frictional forces generated by inwardly compressive forces produced by an outer generally thin walled motor housing. Accordingly, the improved motors are characterized by stiffness, which is extremely high, and a mass that is very low to provide a resonant frequency above the operating range, typically of jet aircraft engines, i.e., >1 kHz. Should vibrational forces exceed such levels the improved motors have a large reserve of damping from high clamping forces which remains in effect even in the event of some yielding by motor components.

It is therefore a principal object to provide for improved, more reliable torque motors generally comprising first and second flux conducting pole pieces spaced from one another to define air gaps. An armature is suspended between the pole pieces with ends thereof extending into the air gaps. A motor output shaft means is rigidly affixed to the armature for movement therewith. Electromagnetic coil means are positioned about the armature. Permanent magnetic means having first and second sections of opposed polarity are disposed on opposite sides of the armature and in engagement with the pole pieces. The device relies on an outer casing for housing the motor with components of the motor being held rigidly in place through frictional forces from compressive engagement of the motor assembly by the outer casing.

The outer casing or shell for housing the motor is generally rounded, and more specifically, generally circular or oval shaped, but more preferably cylindrically shaped wherein the interior wall (ID) or a portion of the interior wall surface of the casing or shell compressively engages with the peripheral edges of motor components.

It is therefore, still a further object of the invention to provide a torque motor having a press fit connection between the interior wall portion of the outer casing, i.e., ID, and the peripheral edges of motor components. Substantial inwardly directed clamping forces are produced by means of an interference fit between motor components, usually pole pieces, electromagnetic coils and permanent magnets, through direct and/or indirect engagement by the outer casing. The relatively thin walled, small diameter tubular construction of the outer casing engaging motor components compresses them inwardly as a result of the interference fit, particularly when achieved with the aid of elevations in the casing wall projecting inwardly against the permanent magnets. The compressive engagement generated through the interference fit by the generally thin walled outer casing, especially when employed with inwardly directed surface elevations produces a significantly stronger, more rigid structure on a weight to stiffness basis relative to that achieved when assembled as a solid structure potted with polymeric resins. As an alternative to surface elevations on the ID of the thin walled outer casing, the magnets may have elevations or outwardly extending bumps for engagement with the ID of the thin walled outer casing. Hence, the invention as disclosed herein enables elimination of the resin and adhesive fillers customarily used heretofore.

It is still a further object to provide torque motors comprising first and second substantially C-shaped pole pieces with terminal end portions of the first pole piece oppositely spaced from terminal end portions of the second pole piece to define air gaps therebetween. An armature is suspended between the pole pieces with end portions thereof extending into the air gaps. The armature is supported by a flexural spring suspension to allow angular displacement between the air gaps. Advantageously, the pole pieces and armature have openings adjacent to the air gaps keyed for receiving means for measuring the width of the gaps, e.g., feeler gauge means, and fasteners for setting the width of the air gaps. Motor output shaft means preferably extends transversely from the armature within a flexible fluid delivery tube which also provides flexural suspension of the armature. Electromagnetic coil means are positioned about the armature for establishing magnetic flux in the armature of selected polarity and strength. Multiple permanent magnets have first and second portions of opposed polarity with each portion disposed on opposite sides of the armature and in engagement with the pole pieces. The motor is housed by means of an outer casing having a generally thin walled rounded configuration wherein the components of the motor are rigidly held in place by clamping forces produced by the outer casing.

While the foregoing torque motor may be generally oval shaped, a cylindrically shaped outer casing with interior surface elevations is preferred for maximizing rigidity and resistance to vibration through interference fit with the motor assembly. The improved torque motors also preferably include useful motor assembly jig means positioned adjacent to the peripheral edge of the motor components and outer casing. The assembly jig is installed before the outer housing for restraining longitudinal/vertical movement of the motor components during press fit placement of the outer casing.

The present invention includes a wide range of useful applications for the actuators, such as in controlling fluid flow in hydraulic systems, fuel flow controls, braking systems, and so on. However, because of their uniquely high reliable performance the torque motors are especially well suited for aviation, and other applications wherever severe to extreme operating conditions due to vibration and rapid heating/cooling cycles may exist. In this regard, the torque motors as disclosed herein are especially useful in combination with servovalves generally, and more specifically, in combination with hydraulic fuel valves, and other applications requiring virtual fail safe performance, such as in jet aircraft engines.

In accordance with the invention, methods are also provided for reducing the susceptibility of torque motors to external vibration while also maximizing structural damping effect. That is to say, it is yet a further object of the invention to provide in addition to more reliable torque motors and applications therefor, useful methods for assembling torque motors by the steps of:

(i) providing a torque motor comprising at least the following components: a plurality of spaced pole pieces forming air gaps therebetween, an armature, means for suspending the armature between the air gaps, at least one coil positioned about the armature and at least one magnet in engagement with the pole pieces;

(ii) providing an outer casing for housing the torque motor of step (i), the outer casing having a generally thin walled rounded configuration and dimensions limited to provide an interference fit when engaged with the peripheral surface of the torque motor assembly, and (iii) assembling the outer casing of step (ii) onto the torque motor of step (i) by slidably press fitting the casing therearound to apply clamping forces directly or indirectly on the torque motor components to positively retain them in place by frictional forces without requiring adhesives, resins or fastener means.

It will be understood that in some configurations of torque motors where the foregoing method of assembly employs but a single magnet and coil, for example, the space ordinarily occupied by a second coil; second, third or fourth magnet, and so on, may require two or more non-functional or "dummy" components in place thereof. Otherwise, the assembly will not have the desired compressive fit with the outer casing.

It is still a further object to provide improved methods for assembling torque motors wherein the pole pieces and armature have openings adjacent to the air gaps, which openings are keyed to receive means for measuring the width of the air gaps and for receiving fasteners for adjusting the width by elevating or lowering the pole pieces. Such methods are especially useful in eliminating the inefficient process of "trial assembly" frequently employed heretofore wherein each motor was assembled twice by the steps comprising a first trial assembly; measuring the air gaps between the armature and pole pieces, disassembly of the torque motor; machining and cleaning the parts to achieve the desired air gap width, followed by a second/reassembly of the motor.

For purposes of this invention the term "width" with respect to air gaps is intended to mean the distance between the pole face and armature surface.

BRIEF DESCRIPTION OF THE DRAWINGS

For a further understanding of the invention and its characterizing features reference should now be made to the accompanying drawings wherein:

FIG. 2 is an exploded view of the torque motor assembly of FIG. 1;

FIG. 3 is a sectional view of the torque motor-servovalve assembly taken along line 3—3 of FIG. 11;

FIG. 4 is a top sectional view of the torque motor taken along line 4—4 of FIG. 3;

DESCRIPTION OF THE PREFERRED EMBODIMENTS

Figure 1:
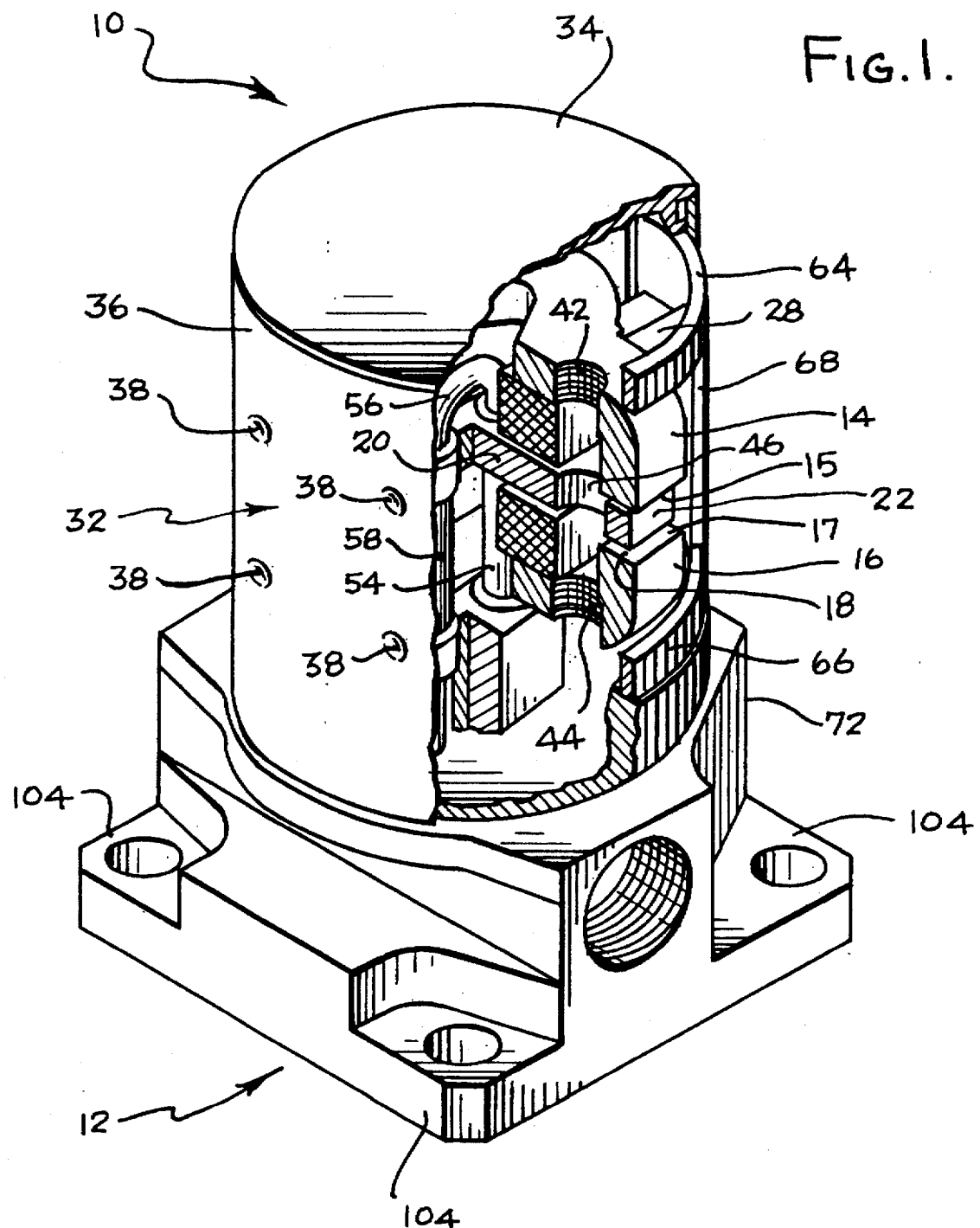
FIG. 1 is a perspective view of a cylindrically shaped torque motor mounted to a servovalve housing with motor components broken away to show the interior of the motor assembly.

Turning first to FIGS. 1-2, there is shown one embodiment of a torque motor 10 assembled according to the invention and mounted onto the housing of an hydraulic fuel valve 12, a type of servovalve, wherein the torque motor performs as an actuator therefor. While the particular configuration of the internal components of motor 10, as discussed hereinbelow, is provided for purposes of illustration, it is to be understood that the inventive concepts as disclosed herein apply to virtually any torque motor configuration having comparable applications, and the torque motor of FIG. 1 is only representative. For purposes of this invention, such motors should have at least two spaced pole pieces, an armature, means for suspending the armature to allow rotation in the air gaps between the spaced pole pieces, one or more coils, at least one magnet and a motor housing.

One preferred embodiment of a torque motor incorporating the concepts of this invention is illustrated by FIG. 1 wherein torque motor 10 comprises first and second pole pieces 14–16, respectively having opposing pole faces 15–17 spaced from one another to provide an air gap 18 therebetween. Shims 19 (FIG. 3) on upper pole face 15 limit displacement of the armature. Armature 20 with end pieces 22 is positioned between pole faces 15–17 for angular displacement in air gap 18. A generally U-shaped tube assembly 24, best illustrated by FIG. 2, includes a jet pipe 59 which passes through the interior of flexure tube 58. Jet pipe 59 functions as the motor output shaft, and is coupled to valve housing 12 by engaging the enlarged lower end of flexure tube 58 to inlet 62. In general, the output shaft of the invention may be coupled to any type of load, such as clutch, brake, spool valve, or as in the illustrated representative example acts to convey motion of the armature to the jet pipe controlled by the torque motor.

Electromagnetic coils 26 positioned about the armature provide magnetic flux to the armature. Permanent magnets 28 are stationed at the peripheral edges of the motor with poles of opposite polarity of each magnet positioned on opposite sides of armature 20. A motor assembly jig 30 in the form of a component cage, although optional, is especially useful as a retainer to restrict longitudinal movement of the above components during press fit placement of motor housing 32 circumferentially around the motor assembly. Encasement of the motor is completed with a housing cap 34 which provides secondary retention of the magnets and coils after assembly.

The exploded view of FIG. 2 provides more 15 details of the motor assembly of FIG. 1. In this regard, it will be observed that motor housing 32 may in one preferred embodiment consist of a cylindrically shaped thin walled sleeve 36, formed from a metal or metal alloy, preferably one having the same or approximately the same coefficient of thermal expansion of materials used in fabricating other motor components, e.g., pole pieces, armature and magnets; have high strength and ideally be non-magnetic. A representative preferred motor housing material is titanium metal or titanium alloy, such as 6Al4V, which is commercially available through ordinary channels of commerce. Expressions like "thin walled" are principally intended to relate to thicknesses in the range of approximately 0.012 to about 0.030 inches.

Optionally, but preferably, thin walled metallic sleeve 36 of motor housing 32 contains a multiplicity of inwardly directed surface elevations or dimples 38 strategically positioned to engage with each of permanent magnets 28, of which there are four.

Figure 5:
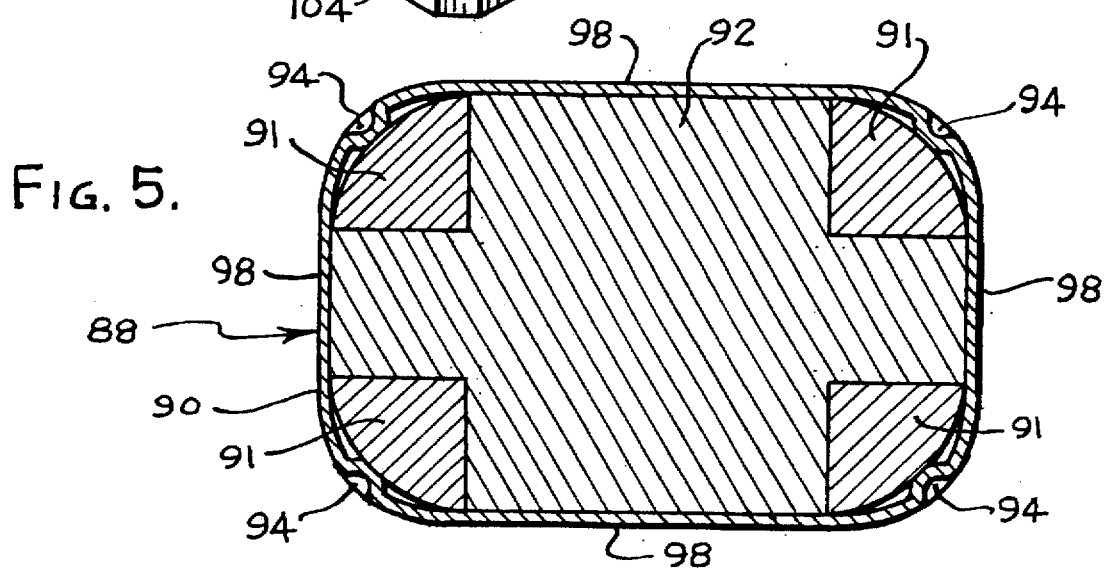
FIG. 5 is an end view of an oval shaped torque motor according to the invention.

While torque motors embodying the concepts of the invention most preferably relate to actuators having circular configurations, e.g., housed in cylindrically shaped outer casings, it should be understood the concepts of the invention as disclosed herein also apply to torque motors assembled in other generally rounded configurations, such as the oval shaped actuator illustrated in FIG. 5. In this regard, torque motor 88 (FIG. 5) contains a motor housing 90 which engages the motor assembly 92 applying inwardly directed compressive forces as a result of an interference fit between outer housing 90 and motor assembly 92. As with cylindrically shaped motors, frictional forces generated by the oval shaped housing impart desired rigidity and strength to the motor assembly for greater resistance to external vibration while maximizing structural damping. The forces resisting vibration are especially effective when motor housing 90 includes multiple inwardly directed surface elevations 94, such as those illustrated in the form of dimples on the ID of the housing which engage with each of magnets 91.

Permanent magnets 28 (FIG. 2) are quarter rounds with each having an inner notch 40 to provide upper first and lower second end portions of opposite polarity with each end portion disposed on opposite sides of the armature.

Pole pieces 14–16 are substantially C-shaped and spaced from one another with their pole faces 15–17 positioned opposite the other. Armature 20 includes terminal end portions 22 intersecting the plane between the pole faces forming upper and lower air gaps at each end of the armature typically ranging from 0.005 inches to about 0.025 inches. Upper and lower flux conducting pole pieces 14–16 preferably have threaded openings 42–44, respectively running perpendicular and adjacent to pole faces 15–17. Armature 20 contains non-threaded openings 46 keyed to coincide with openings 42–44 of pole pieces 14–16. As will be discussed in greater detail below, the openings in the pole pieces and armature are specially useful in measuring and setting the width of air gaps between the pole pieces and armature during the assembly procedure.

Electromagnetic coils 26 for generating magnetic flux in the armature each have a central opening 48 for receiving armature end pieces 22. Coils 26 are also equipped with spacers 50 and electrical conductors 52. Spacers 50 engage with each other, as best illustrated by FIG. 4.

As previously stated, armature 20 is equipped with a transversely positioned motor output shaft consisting of a generally U-shaped tube assembly 24. Armature 20 is suspended between the air gaps by a pair of flexure tubes 54–58 which allow the armature to rotate about an axis passing through the axis of both flexure tubes at the mid-length of their flexing portions. Flexure tube 54 serves to convey fluid from a supply duct 60 to a U-shaped tube 56 which connects to jet pipe 59 running through flexure tube 58. Flexure tubes 54–58 act as flexural seals preventing fluid from contacting torque motor components. While U-shaped tube assembly 24 is illustrated extending perpendicularly from the armature, it will be understood the invention contemplates alternative motor configurations, e.g., wherein the motor output shaft and flexure tube suspension means run longitudinally with the armature.

Assembly jig 30 consists of a cylindrically shaped metallic cage having axially aligned ring sections 64–66 and dual connecting struts 68. The cylindrically shaped assembly jig 30 is made to be expandable when slidably engaged over the motor assembly. This is accomplished by not bonding adjacent edges of the jig, but instead providing a gap 70 at one strut 68.

One useful assembly procedure which avoids inefficient trial assembly methods previously described for the torque motors of this invention consists of installing flexure tubes 54–58 by pressing into openings into armature 20 followed by first brazing tubular elbow 56 and jet pipe 59 thereto. Flexure tubes 54 and 58 of the armature-jet pipe assembly are then press fitted to the servovalve housing outlet 60 and inlet 62, respectively. Electromagnetic coils 26 can then be inserted onto the armature by slipping coil openings 48 over armature end pieces 22. Coil conductor leads 52–53 are then routed through lead exit 72 in servovalve housing 12. Lower second pole piece 16 is slid into place below the bottom edge of coils 26. Notch 74 in lower pole piece 16 enables positioning without interference with flexure tubes 54–58. Upper pole piece 14 is then placed over coils 26. The assembly jig 30 is then spread open at gap 70 with a spacer (not shown) sufficiently to allow longitudinal passage over the torque motor assembly including past the armature and coils. The jig spacer is then removed and coils 26 positioned inside the areas having three sided rectangular openings 76 in assembly jig 30. Each of the 4 magnets are then vertically positioned in the open areas of the cage adjacent to the coils 26, as best illustrated by FIG. 4.

Figure 6:
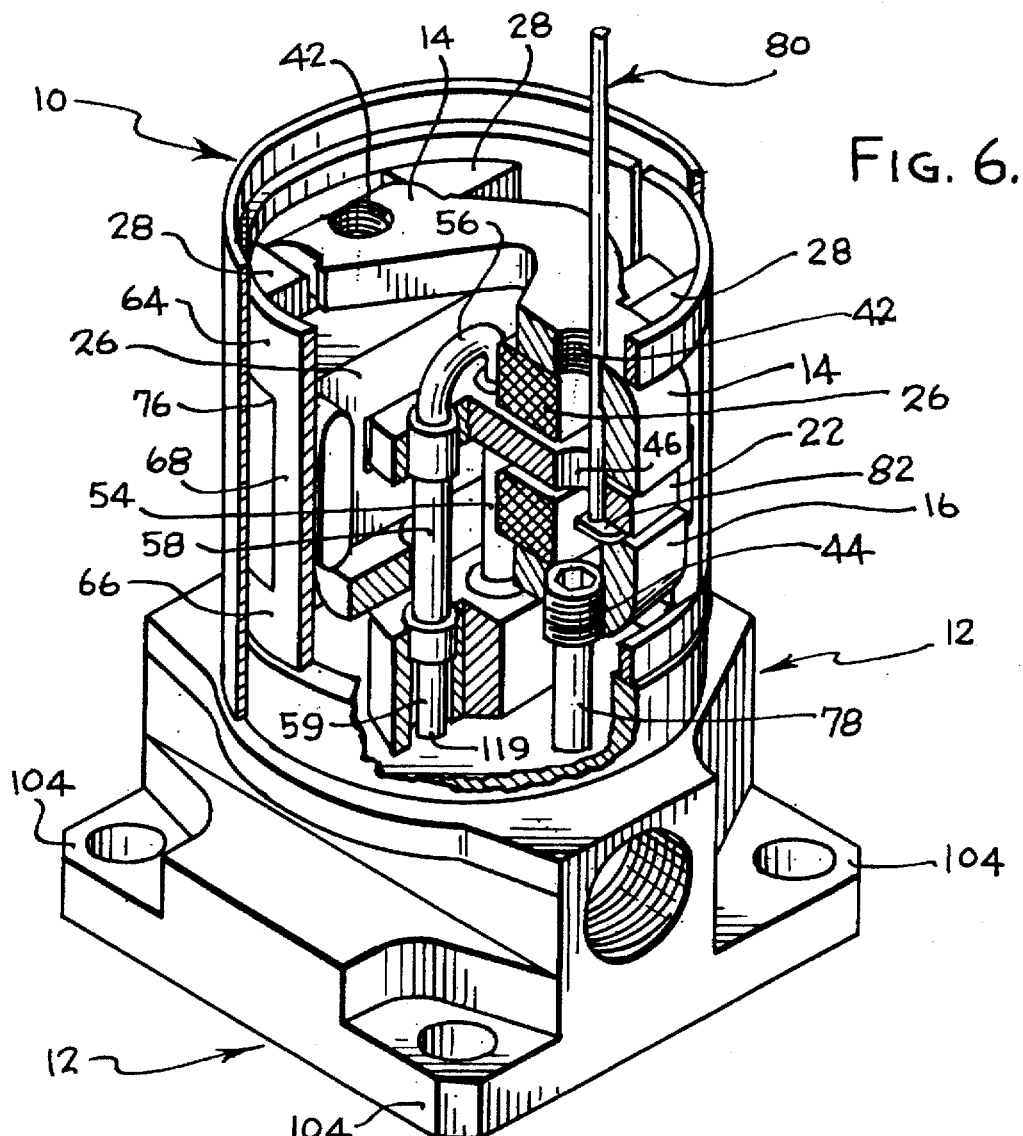
FIG. 6 is a perspective view of a torque motor with parts broken away to show the method for adjusting the lower air gap without requiring disassembly.

Before pressing on sleeve 36 of motor housing 32 onto the torque motor assembly, threaded jack screws 78 (FIG. 6) are installed in tapped openings 44 of lower pole piece 16. Jack screws 78 are initially tightened to elevate the lower pole piece so pole faces 17 are in contact with the bottom side of armature end pieces 22 to provide zero lower air gaps.

Sleeve 36 of motor housing 32 have surface elevations 38 (FIGS. 1, 2 and 4) aligned so they make firm contact with the centers of each magnet 28 OD surface when the sleeve is pressed into place. Frictional force between sleeve 36 ID and upper pole piece 14 apply pressure to the upper side of armature 20. However, armature 20 is securely supported by lower pole piece 16 and jack screws 78 to also provide zero upper air gaps. Longitudinal/vertical movement of magnets 28 is restricted by assembly jig 30 during press fit placement of the metal sleeve.

After fully pressing tubular sleeve 36 in place circumferentially about the torque motor assembly the lower air gaps must be reformed between each pole face 17 of lower pole piece 16 and the underside of armature 20, and upper air gaps reformed between each pole face 15 of upper pole piece 14 and the upper side of armature 20. The lower jack screws 78 (FIG. 6) are turned counter clockwise about one-half revolution to elevate the lower jack screw ends off the floor of valve housing 12. This in-turn will permit lowering lower pole piece 16 about 0.016 inch, assuming a 0.032 inch thread for the jack screws, by tapping the heads of the lower jack screws with the aid of an allen wrench, or other small tool. A feeler gauge 80 (FIG. 6) can then be inserted into openings 42 in the upper pole piece to check the width of the lower air gaps between the underside of the armature and each of pole faces 17. Feeler gauge 80 can be equipped with a small metallic disc 82 having a thickness, e.g., 0.015 inches. Any adjustments in the width of the lower air gaps can be effectuated by turning lower jack screws. It will be understood that use of the above feeler gauge for measuring the air gaps is only one representative example of such a device. And the invention contemplates use of any number of measuring means, such as optical methods of directly observing the air gap via a diagonal mirror inserted into the hole, and measuring the gap by visual comparison with a graduated reticule.

Figure 7:
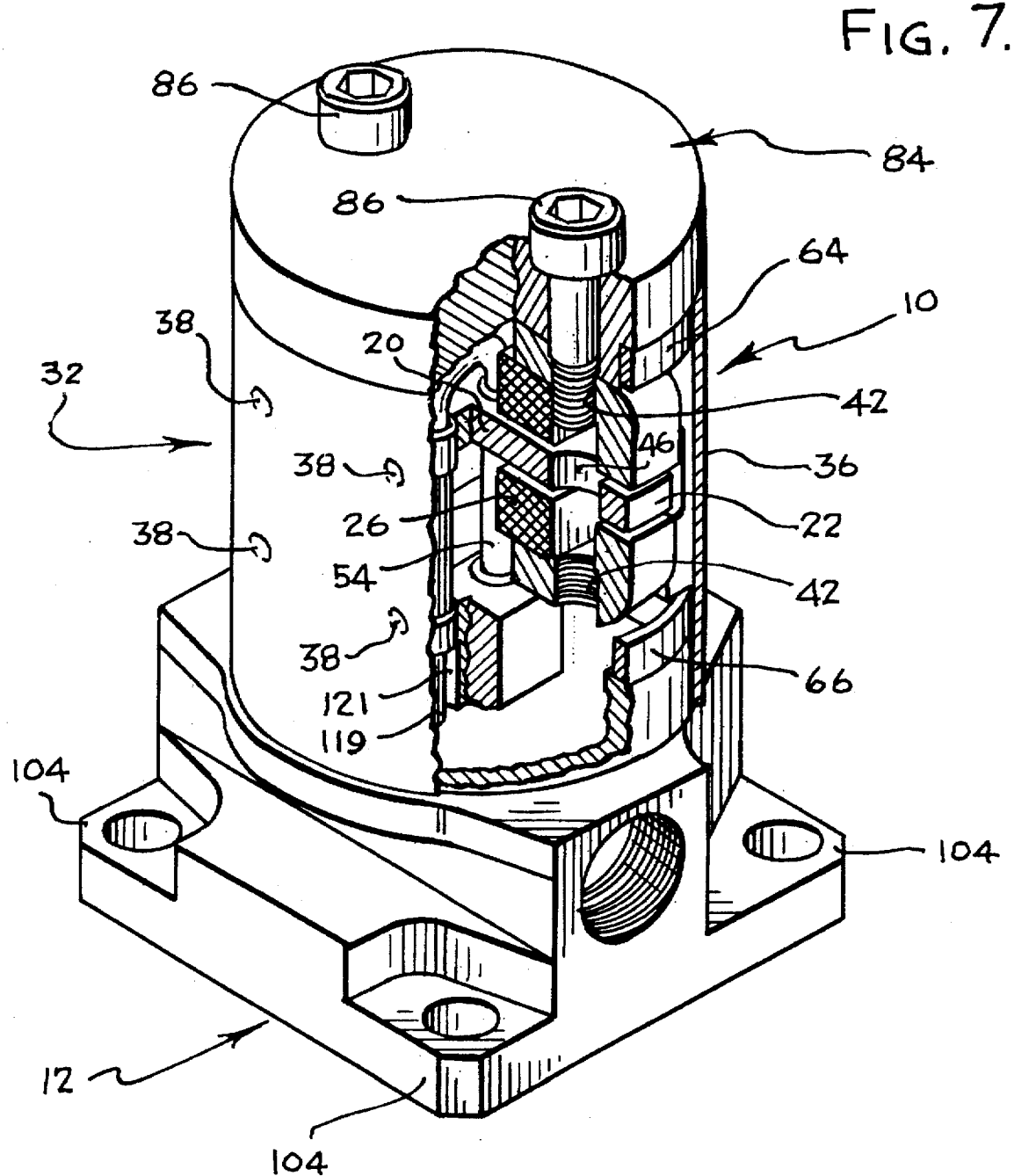
FIG. 7 is also a perspective view of a torque motor with parts broken away showing an air gap adjusting fixture mounted to the upper end of the motor for moving the upper pole piece.
Figure 8:
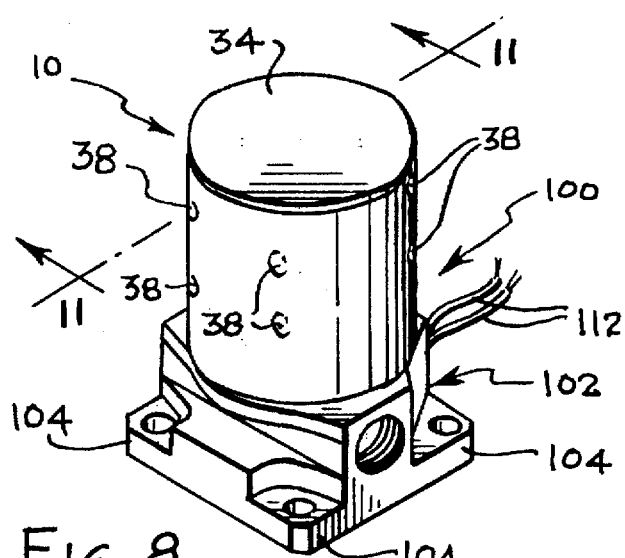
FIG. 8 is a side perspective view of an assembled torque motor and servovalve.
Figure 9:
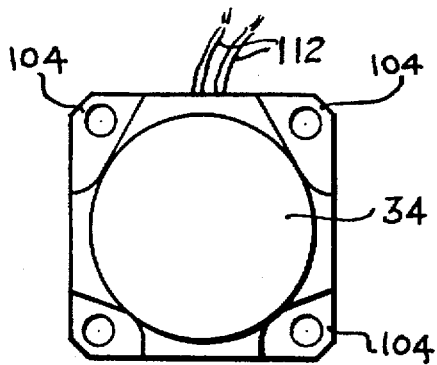
FIG. 9 is a top plan view of the torque motor-servovalve combination shown in FIG. 8.
Figure 10:
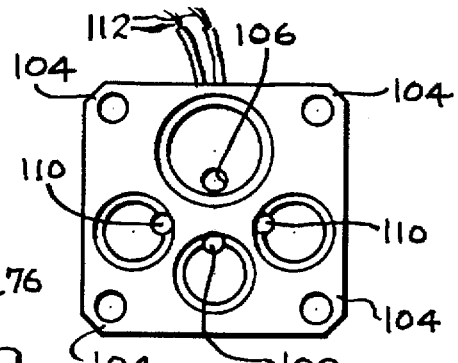
FIG. 10 is a bottom view of the torque motor-servovalve combination shown in FIG. 8.
Figure 11:
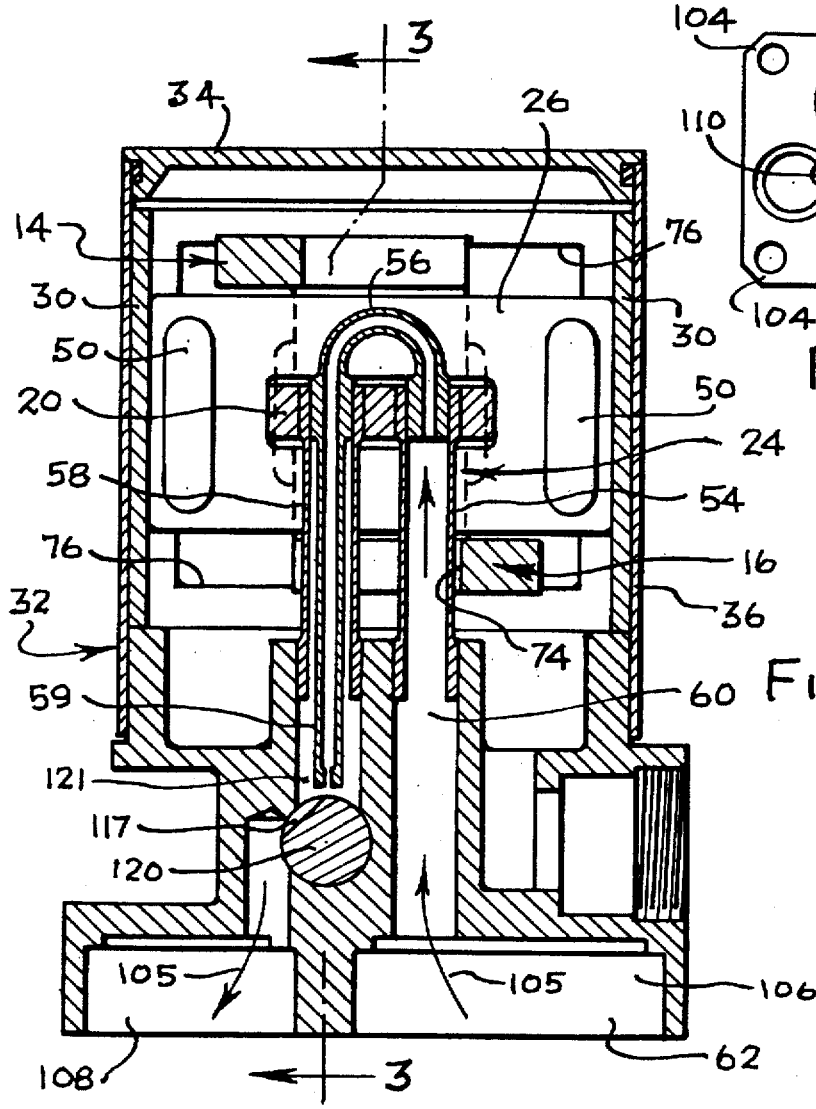
FIG. 11 is a side sectional view of the torque motor-servovalve combination taken along line 11—11 of FIG. 8.

The width of the upper air gaps between pole faces 15 of upper pole piece 14 and armature 20 can be adjusted by attaching air gap fixture 84 (FIG. 7) with jack screws 86 to the upper end of motor housing 32. Threaded jack screws 86 once engaged with tapped openings 42 in the upper pole piece can be used to elevate the upper pole piece by turning about one-half revolution to provide a gap of about 0.016 inches. The width of the gap can be verified with feeler gauge 80 as previously discussed in connection with the lower air gaps. After adjusting the air gap dimensions, optionally they can be permanently locked into place by any number of methods, including spot welding the pole pieces, applying a threaded fastener through the side wall of sleeve 36, and so on.

As previously indicated, one principal aspect of the invention is reducing the susceptibility of a torque motor to external vibration while maximizing structural damping. The inventors have been able to achieve this objective by holding the components of the motor assembly rigidly in place through frictional forces from compressive engagement of the motor assembly by means of a generally thin walled tubular casing, e.g., cylindrically shaped sleeve 36 (FIG. 4), oval shaped sleeve 90 (FIG. 5), etc. The inward compressive forces according to the invention are generated through an interference fit between the tubular shaped housing and the motor assembly. The inventors, however, have discovered that ID surface elevations 38 (FIG. 4) and 94 (FIG. 5) are specially useful in producing even a higher degree of rigidity and stability in motor assemblies because it was discovered serendipitously that the elevations have a tendency to produce a stretching and a generally flattening effect on the thin metal tubular housing sidewalls in areas 96 (FIG. 4) and 98 (FIG. 5) between adjacent elevations. Desirably, this flattening effect produces more inwardly directed compressive forces for even greater motor stability.

FIGS. 3 and 8–11 relate to the torque motor-hydraulic fuel/servovalve combination 100. Servovalves are devices which control flow or pressure of fluids (liquid or gas) in proportion to an electrical input. They are a subgroup of servovalves in general that control fluid pressure or flow in proportion to mechanical, pneumatic, electrical, thermal, optical or magnetic input. Hydraulic valve 102 (FIG. 8) in particular is useful in controlling the flow of fuel to a jet aircraft engine. The valve housing includes flanges 104 for mounting the device with threaded fasteners (not shown). The underside of valve 102 shows various ports without filter screens, including a large supply port 106 which is connected to a source of fluid under pressure (liquid or gas); a return port 108 connected to a source of lower pressure, or sink, two control ports 110, which are connected to an hydraulic load, such as a piston actuator 111 (FIG. 3), and a pair of electrical conductors 112 connected to an adjustable source of electric current.

An electric current applied to the torque motor causes the flow of hydraulic fluid 105 (FIG. 11) from supply port 106 to a control port 110 (FIG. 3), the particular control port being determined by the location of the jet pipe nozzle 119 of jet pipe 59 relative to bores 116 and 118 of receiver 120. The position of the jet pipe and nozzle relative to the receiver bores is proportionately modulated according to the amplitude of the current applied to the torque motor and polarity. Thus, as the armature proportionally moves the jet pipe nozzle 119 at the extreme end of jet pipe 59 the nozzle will ether be coincident with the axis of either receiver bore, or midpoint of the bridge between the bores, or at any location between these limits. It will be noted, except where jet pipe 59 is pressed into the outer flexure tube 58 the OD of jet pipe 59 is less than the ID of the flexure tube. This structural feature allows the jet pipe to rotate inside the flexure tube with angular displacement of the armature upon actuation of the torque motor. Lateral displacement of the jet pipe between receiver bores 116 and 118 is thus due to its rotational movement.

Valve 102 also possesses important structural features that enables adjustment of hydraulic output for zero current by mechanical setting means incorporated therein. These structural features are significant in preventing inadvertent changes in the null adjust which might otherwise be caused by external influences, such as temperature change, shock or vibration. Receiver 120 (FIG. 3) is mounted for lateral right and left movement, but advantageously restricted in rotational movement. On the left side (FIG. 3) null adjust means consists of a null adjust threaded screw 122 shown threaded into a plug 123 which is retained in the valve housing by means of an externally threaded sleeve 124. At the opposite end or the right side of receiver 120 there is a rectangular tab 126 extending axially from the receiver which engages with slot 128 in plug 130, the latter being retained by an externally threaded sleeve 132 in the valve housing.

Conical spring washers (Bellville) 134 at the right end of receiver 120 hold the receiver against null adjust screw 122. Because of the preloading by conical springs 134 when the null adjust screw is rotated the receiver moves laterally to the left or right depending on the direction of rotation of the screw. This is especially useful in making precise axial adjustments for zero input current in positioning receiver bores 116–118 relative to the center of nozzle 119 of the jet pipe. Advantageously, such lateral adjustments of the receiver can be performed without causing rotation of the receiver about its axis. Any rotational movement occurring during null adjust would allow the receiver bores to move away from their preferred position, which is exactly centered under the jet pipe. Rotational movement of the receiver is prevented by close fit engagement of rectangular tab extension 126 with slot 128 of plug 130. Thus, the receiver is able to move side-to-side freely when making deliberate null adjustments while simultaneously prevented from making unintended rotational movements by simply turning a single null adjust screw (122).

Nevertheless it may be necessary to adjust the position of receiver 120 relative to the center of the jet pipe by rotational movement, either clockwise or counter clockwise. This adjustment can be performed by loosening externally threaded sleeve 132, and rotating plug 130 by engaging slot 128 with a screwdriver. Once the receiver is rotated to the correct position externally threaded sleeve 132 is re-tightened to lock plug 130 and receiver in the desired position.

As previously discussed, an electric current applied to the torque motor causes the flow of hydraulic fluid 105 (FIG. 11) from supply port 106 to a control port 110 (FIG. 3). At the same time, the alternate control port 110 (FIG. 3) performs as a connection for return flow 114 from piston actuator 111 through receiver bore 116 to fill return space 121 (FIG. 3) located between OD of jet pipe 59 and ID of flexure tube 58. The return flow proceeds as a low pressure drain from slot 117 (FIG. 11), a tangential notch in receiver 120, to return port 108 (FIG. 11) for collection as hydraulic fluid supply 105.

While the invention has been described in conjunction with various embodiments they are illustrative only. Accordingly, many alternatives, modifications and variations will be apparent to persons skilled in the art in light of the foregoing detailed description, and it is therefore intended to embrace all such alternatives, modifications and variations as to fall within the spirit and broad scope of the appended claims.

We claim:

1. A torque motor comprising first and second flux conducting pole pieces spaced from one another to define air gaps; an armature suspended between said pole pieces with ends thereof extending into said air gaps; motor output shaft means rigidly affixed to said armature for movement therewith; electromagnetic coil means positioned about said armature; permanent magnetic means having first and second sections of opposed polarity disposed on opposite sides of said armature in engagement with said pole pieces, and an outer casing for housing said motor, components of said motor being held rigidly in place through frictional forces from compressive engagement by said outer casing.

2. The torque motor of claim 1 wherein the peripheral edges of said pole pieces, coil means and magnetic means are compressively engaged by means of the interior surface of said outer casing.

3. The torque motor of claim 1 wherein components of said motor are held in place by inwardly directed clamping forces produced by an interference fit between said outer casing and the peripheral edges of said pole pieces, coil means and magnetic means of said motor.

4. The torque motor of claim 1 wherein components of said motor are held in place by inwardly directed clamping forces from an interference fit between the interior surface of said outer casing and the peripheral surface of said magnetic means.

5. The torque motor of claim 4 wherein the interference fit between said interior surface of said outer casing and said peripheral surface of said magnetic means is produced through surface elevations.

6. The torque motor of claim 5 wherein the surface elevations are located on said outer casing.

7. The torque motor of claim 5 wherein the surface elevations are located on the outer surfaces of said permanent magnetic means.

8. The torque motor of claim 1 wherein said outer casing is a cylindrically shaped housing.

9. The torque motor of claim 4 wherein said outer casing is a generally thin walled cylindrically shaped housing.

10. The torque motor of claim 1 wherein said outer casing is generally oval shaped.

11. The torque motor of claim 1 including jig means for restraining longitudinal movement of said motor components during engagement of said outer casing, said jig means positioned adjacent to the peripheral edge of said motor components and the interior surface of said outer casing.

12. The torque motor of claim 1 wherein the output shaft extends perpendicularly from said armature, said armature supported for angular displacement in said air gaps.

13. The torque motor of claim 1 wherein the first and second flux conducting pole pieces and the armature have perpendicular openings in proximity to said air gaps for receiving means for measuring the width of said air gaps and fasteners for setting the width of said air gaps.

14. The torque motor of claim 11 wherein the first and second flux conducting pole pieces and the armature have perpendicular openings in proximity to said air gaps for receiving means for measuring the width of said air gaps and fasteners for adjusting the width of said air gaps.

15. The torque motor of claim 1 which is free of polymeric fillers and motor component fasteners.

16. The torque motor of claim 1 wherein the axis of said armature is coextensive with the longitudinal axis of said outer casing.

17. The torque motor of claim 1 wherein the axis of said armature is transverse to the longitudinal axis of said outer casing.

18. The torque motor of claim 1 in combination with a servovalve.

19. The torque motor of claim 1 in combination with a hydraulic fuel valve.

20. A torque motor comprising first and second substantially C-shaped pole pieces with terminal end portions of the said first pole piece oppositely spaced from terminal end portions of said second pole piece to define air gaps therebetween, an armature disposed between said pole pieces with end portions thereof extending into said air gaps, said armature suspended for angular displacement between said air gaps, said pole pieces and armature having openings adjacent to said air gaps keyed for receiving means for measuring the width of said air gaps and fasteners for adjusting the width of said air gaps; motor output shaft means extending transversely from said armature comprising a flexible fluid delivery tube; electromagnetic coil means positioned about said armature for establishing magnetic flux in said armature of selected polarity and strength; multiple permanent magnets having first and second portions of opposed polarity with each portion disposed on opposite sides of said armature, and an outer casing having a generally thin walled rounded configuration for housing said motor, components of said motor rigidly held in place by clamping forces produced by said outer casing.

21. The torque motor of claim 20 wherein said outer casing is a cylindrically shaped housing.

22. The torque motor of claim 20 wherein said outer casing is a generally oval shaped housing.

23. The torque motor of claim 21 wherein said clamping forces are produced by an interference fit between said cylindrically shaped outer casing and components of said motor.

24. The torque motor of claim 23 where said cylindrically shaped outer casing includes interior surface elevations and the interference fit is produced by said elevations engaging the peripheral surface of said permanent magnets.

25. The torque motor of claim 21 including jig means for restraining longitudinal movement of said motor components during engagement of said outer casing, said jig means positioned adjacent to the peripheral edge of said motor components and the interior surface of said outer casing.

26. The torque motor of claim 21 in combination with a servovalve.

27. The torque motor of claim 22 in combination with a servovalve.

\* \* \* \* \*